3,677,734
PRODUCTION OF FERTILIZER FROM WET PHOSPHORIC ACID
Robert L. Carroll and Charles R. Hayward, Richmond, Va., assignors to Swift Agricultural Chemicals Corporation, Chicago, Ill.
Filed Aug. 25, 1969, Ser. No. 852,632
Int. Cl. C05b 7/00; C01b 25/28
U.S. Cl. 71—34       6 Claims

ABSTRACT OF THE DISCLOSURE

Ammonium polyphosphates having a major portion of the $P_2O_5$ content thereof in the form of condensed phosphates, are prepared by ammoniating wet-process phosphoric acid with ammonia in a multi-stage operation under specified conditions.

RELATED APPLICATIONS

This application is related to application Ser. Nos. 715,835 and 715,834, each of which was filed Mar. 25, 1968

FIELD OF INVENTION

This invention has to do with the production of ammonium polyphosphates by ammoniation of wet-process phosphoric acid. More specifically, the invention relates to an improved process for forming ammonium polyphosphates wherein conversion to a final product containing at least about 40, and preferably at least 50, percent of the total $P_2O_5$ in the condensed phosphate form is possible. This product is acceptable for either solid or high analysis fluid application.

As used herein, the term "condensed phosphates" denotes all phosphates other than orthophosphates.

BACKGROUND OF THE INVENTION

Ammonium polyphosphate fertilizers, wherein at least 55 and preferably greater than 60 percent of the $P_2O_5$ is present as pyrophosphate, triphosphate and long chain phosphates, are essential in the preparation of stable high analysis fluids. This is primarily due to the crystallization characteristics of monoammonium and diammonium orthophosphate phases in the fertilizer fluids such as 11-37-0 and 12-40-0 (i.e., N—$P_2O_5$—$K_2O$). From the point of view of higher solubility and, hence, higher analysis fluids, it would be advantageous to generate as many components as possible in the liquid phase, the net result being the reduction of the concentration of any single component for a given $P_2O_5$ concentration. It has been found that this does not occur appreciably in the ammonia-phosphate system until at least 50 percent of the total $P_2O_5$ is present as condensed phosphates. Also, a disadvantage of a low polyphosphate product is that the crystal size of monoammonium phosphate and the diammonium phosphate is difficult to control. The problem with higher order ammonium phosphates is greatly reduced.

Another important advantage for a product containing a greater linear polyphosphate content is the enhancement of the sequestration capability. This is particularly advantageous when the $R_2O_3:P_2O_5$ mole ratio in the wet-process feed acid is high and when micronutrients and other additives are added to the blended fluid grades. Metal impurities present in the acid are expressed as $R_2O_3$, wherein R represents metals such as aluminum and iron.

From the standpoint of freight, it would be advantageous to have the capability of shipping a high analysis base solid (of N and $P_2O_5$) to distribution points rather than a high analysis base fluid. Further, it would be desirable from a freight advantage that the solid be as low in nitrogen analysis and, hence, as high in $P_2O_5$ analysis as possible and still exhibit the necessary hydrolytic and storability properties. The capability of producing fluids directly from a solid base material also reduces significantly the overall capital investment for the manufacturing and marketing systems.

Process now available, however, have not had the capability of the preparation of a stable high polyphosphate and high $P_2O_5:N$ solid from wet-process phosphoric acid, which exhibits good handling characteristics. In the production of ammonium polyphosphate (APP) by known processes, where at least 50 percent of the $P_2O_5$ is in the polyphosphate form, from ammonia and a wet-process acid which contains from 1 to 10 parts by weight impurities of which 0.5 to 4 parts are iron and aluminum expressed as $R_2O_3$, severe problems regarding the quality of the product are encountered. These problems manifest themselves in lowering the water solubility and plant food availability and, hence, resulting in an inferior product which is not acceptable for fluid application. Further, since fertilizers are sold on the basis of plant food availability, the product would be uneconomical. The undesirable properties of the product result from the high temperature and residence time requirements necessary to obtain high conversion to condensed phosphates. Another factor which is of importance is composition of the product. Without the proper control of these variables, compositions with the general formula (Fe, Al) $NH_4P_2O_7$ which are unavailable to the plant, and gelatinous aluminum ammonium phosphates which are available but water insoluble, are formed. The formation of the former is favored at high temperatures, while the latter is believed to form at high ammonia pressure when the nitrogen:phosphorus mole ratio is below 1.

The process of this invention makes possible production of ammonium polyphosphates wherein at least about 50 percent by weight of the $P_2O_5$ thereof is in polyphosphate form, and which polyphosphates have excellent water solubility and essentially complete availability as plant foods.

SUMMARY OF THE INVENTION

In accordance with the present invention, there is provided a process for the production of ammonium polyphosphates by ammoniation of wet-process phosphoric acid, which comprises:

(a) Contacting wet-process phosphoric acid having a $P_2O_5$ content of from about 50 to about 65 percent by weight and an $R_2O_3:P_2O_5$ mole ratio of less than about 0.1, wherein R represents aluminum and iron, with ammonia gas at a gas stream velocity of from about 20 to about 2,500 feet per second, at a $NH_3:H_3PO_4$ mole ratio of from about 0.4 to about 0.8, a temperature between about 375 and about 425° F., a pressure of from about 15 to about 75 pounds per square inch absolute, and a residence time of from about 0.1 to about 4 minutes, to form an ammonium phosphate product and steam;

(b) Removing steam from the product obtained in (a) whereby an ammonium phosphate melt having a N:P mole ratio of less than about 0.8 is formed;

(c) Contacting the ammonium phosphate melt with excess ammonia at a velocity of from about 100 to about 2,500 feet per second, a temperature between about 450° F. and about 550° F., a pressure of from about 30 to about 200 pounds per square inch absolute, and a residence time of from about 5 seconds to less than 2 minutes, to form an ammonium polyphosphate wherein at least about 40 percent by weight of the $P_2O_5$ thereof is in polyphosphate form.

A particular embodiment of the invention is in the improvement of processes for ammoniating a wet-process phosphoric acid with ammonia, by contacting the acid with ammonia at an ammonia gas stream rate of from about 20 to about 2,500 feet per second.

BRIEF DESCRIPTION OF THE DRAWINGS

Advantages of the invention will become apparent to those skilled in the art from the following description considered in conjunction with the drawings wherein.

Wet-process phosphoric acid

Figure 1:
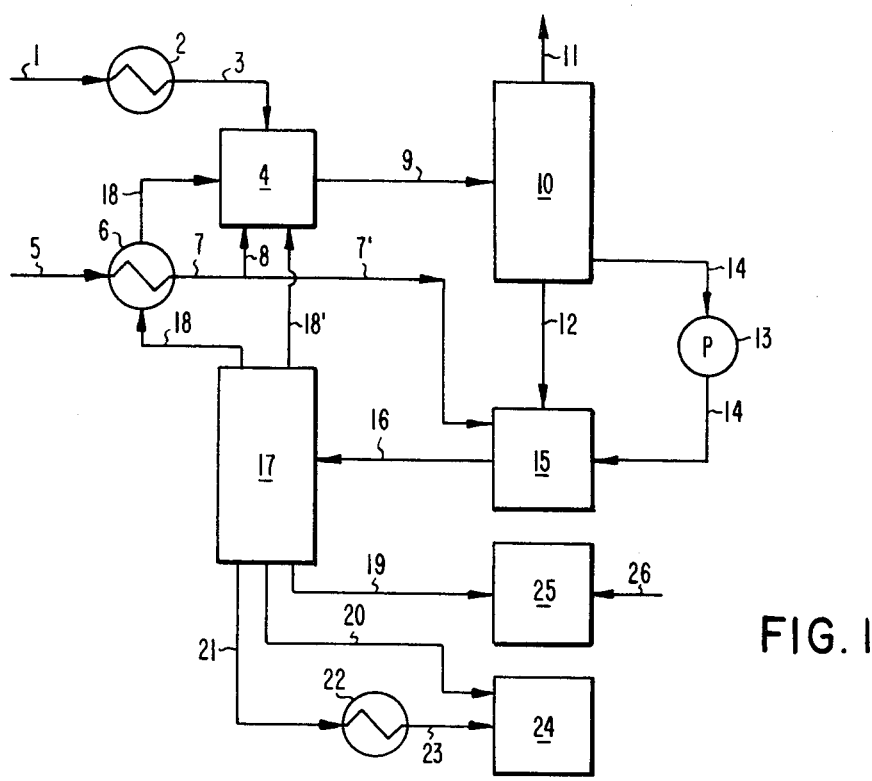
FIG. 1 is a schematic flow diagram illustrating an embodiment of the invention wherein wet-process phosphoric acid is ammoniated in two stages.

Suitable as charge materials for the process of this invention are wet-process phosphoric acids having a $P_2O_5$ content of from about 50 to about 65, and preferably 52–55, percent by weight. Metal impurities, expressed as $R_2O_3$ wherein R represents metals such as aluminum and iron, are substantially absent from such acids, such that the $R_2O_3:P_2O_5$ mole ratio is less than about 0.1. Typical wet-process acids are those obtained from Florida uncalcined ground phosphate rocks (68–74 bone of phosphate lime; 68–74 BPL).

Ammonia

In the first-stage ammoniation of the wet-process acid, ammonia gas is employed, whereas ammonia gas or liquid ammonia can be employed in a subsequent ammoniation of the ammonium phosphate melt formed in the initial operation.

In order to realize the advantageous features of this invention, ammonia is contacted with the wet-process acid and with the ammonium phosphate melt such that the ammonia impinges upon the other reactant. This is accomplished effectively by charging the ammonia at a velocity of from about 20 to about 2,500, and preferably 1,000–2,000, feet per second, in a pipe reactor.

Contact accomplished with a high velocity impingement reactor provides several advantages. The relatively large momentum transferred from the gas to the liquid phase in the reactor causes a substantial increase in surface area. This additional surface area, coupled with higher diffusivity of the high temperature ammonia, causes the reaction of ammonia and phosphoric acid to proceed at a relatively rapid rate. The large surface area and high gas film temperatures permit the diffusion of water from the reaction zone without interfering substantially with the desired reaction. High velocity impingement permits an even energy dispersion in the reaction zone and, hence, reduces excessive localized film temperatures; that is, an impingement molecule, if possessing sufficient momentum, can shear the boundary layer and result in a more homogeneous gas-liquid interaction. Such advantageous features reduce the formation of highly insoluble material which would not be available as plant food.

Temperature

In the initial ammoniation of wet-process acid, temperature is maintained between about 375 and about 425° F., and preferably 390–420° F. The temperature selected is dependent upon the residence time and the quality of the acid. The enthalpy input should be sufficient to remove the bulk of water from the reaction mixture. In a subsequent ammoniation of an ammonium phosphate melt, the temperature can range from about 450 to about 550° F., and preferably 460–480° F., adjusted to one atmosphere pressure.

Pressure

Relatively low pressures are maintained during the initial ammoniation stage. In the initial stage, pressure is from about 15 to about 75, and preferably 35–60, pounds per square inch absolute (p.s.i.a.). In the subsequent ammoniation stage, pressure is from about 30 to about 200, and preferably 40–100, p.s.i.a. The operating pressure of the second stage will be determined by the operating pressure of the first stage, since a minimum pressure drop is required to obtain the required impingement velocity. Moreover, the operating pressure of the second stage should be such that no compression equipment is required, as explained hereinafter in connection with FIG. 1.

Residence time

It is essential that residence time be controlled during the ammoniation stages. Control in both stages is advantageous in order to avoid adverse solubility problems. Thus, in the initial stage, residence time should be of the order of 0.1 to 4, and preferably below 2, minutes, and in a second stage should be from about 5 seconds to about 2, and preferably less than 1, and particularly 0.2–0.5, minute. The relatively high operating temperatures of the second stage promotes formation of non-available $P_2O_5$ compounds; however, formation of excessive amounts of such undesirable compounds is avoided by using short controlled residence times.

Molar proportions

Another important reaction variable is that of the ammonia to $H_3PO_4$ molar ratio. In the initial ammoniation, this ratio should be from about 0.4 to about 0.8, and preferably of the order of 0.5 to 0.7.

With reference to FIG. 1, wet-process phosphoric acid containing between about 50 and about 65 percent by weight of $P_2O_5$ is pumped (not shown) through line 1 of acid heat exchanger 2 at a temperature between about 100 and about 400° F., normally from about 150 to 250° F., and at a pressure of from about 15 p.s.i.a. to about 75 p.s.i.a., and thence through line 3 to impingement reactor 4 which may be simply a pipe reactor. Ammonia is pumped (not shown) through line 5 to furnace heat exchanger 6, which is capable of heating the ammonia to about 900° F., and then through lines 7 and 8 to reactor 4. In normal operations, the anhydrous ammonia feed is split between lines 8 and 7'. The temperature employed for the acid and ammonia feed streams is determined by the desired heat balance for reactor 4 and reactor 15, which is principally concerned with the concentration of the feed acid and the temperatures desired for reactor exit streams 9 and 16. Thus, the contact of the acid and ammonia will be at a temperature of from about 375° F. to about 425° F. and preferably 390–420° F. The flow rates for the acid and ammonia streams are regulated by conventional control valves (not shown).

The ammoniated product and steam formed in reactor 4 are fed via line 9 to stirred vessel 10 wherein the steam is separated and is removed overhead via line 11. The resulting melt, formed in vessel 10 is transferred via pump 13 and line 14, or line 12, to second in-line impingement reactor 15 where further reaction with anhydrous ammonia occurs. The ammonium phosphate melt formed in vessel 10 has a N:P mole ratio essentially identical to that of the reactant streams.

Normally, excess anhydrous ammonia is fed to reactor 15 via line 7' under a pressure of from about 30 p.s.i.a. to about 200 p.s.i.a., and preferably 40 p.s.i.a. to 100 p.s.i.a., where it is transferred with the melt via line 16 to separator 17 and fed back to reactor 4 via furnace 6 and line 18, or alternatively via line 18'. This stream, depending on operating conditions of reactor 4, will contain some steam derived from further conversion to condensed phosphate. Such steam is removed from separator 17 with the excess ammonia. Separator 17 is operated at about the same conditions of pressure and temperature as reactor 15.

The melt in separator 17 is fed via line 21 to cooler 22, which is operated at about the same pressure as separator 17, and then through line 23 into granulation system 24. Cooling before granulation is a requirement for processing an APP melt when the N:P mole ratio thereof is above one and the temperature is above the dissociation temperature of the ammmonium phosphate. If the melt analysis is such that the N:P mole ratio is about one and below about 1.15, and the temperature thereof is below about 460° F., the melt can be transferred directly to pugmill granulation system 24. For granulation systems other than the pugmill, the melt is cooled to a point where nucleation can be induced. This results from the very slow kinetics of crystallization. Also, if it is desired, the melt can be transferred from separator 17 via line 19 to fluid facility 25 to which additional ammonia and water are added via line 26, in order to produce base liquid fertilizer grades such as 10-34-0, 11-37-0 and 12-40-0.

For a product where 40-60 percent by weight of the total $P_2O_5$ is present as condensed phosphates, normally greater than 90 percent of this fraction is present as pyrophosphate. The fact that the polyphosphate distribution in the products of this invention is influenced toward the pyrophosphate species, indicates that this process is not an equilibrium process but, rather, a "steady state" process. This condition can be explained by consideration of the relative stabilities of pyrophosphate and higher linear condensed phosphates and the residence time employed in this process; that is, the hydrolytic stability of long chain polyphosphates is much less than that of pyrophosphate, and the reorganization rate is such that it does not occur within the residence time of this process.

For solid grades, where the analysis corresponds to a N:P mole ratio of about one, diammmonium pyrophosphate is the only possible crystalline phase for pyrophosphate. It has been determined that this phase is non-existent under the varied processing conditions investigated. The orthophosphate in this solid is present predominantly as crystalline monoammonium orthophosphate (MAP). Also, as is evident from X-ray diffraction (XRD) patterns, diammonium pyrophosphate (DAPP), after several months in storage, is not present in the solid as a crystalline phase. Thus, it can be concluded from these data that the only possible crystalline phase for a solid analysis exhibiting a N:P mole ratio of about one is MAP; that the metal ions and, to a lesser extent, the other impurities present in a product prepared from wet-process acid inhibits the formation of a crystalline DAPP base.

It follows to generate additional crystalline phases in the wet-process ammonium polyphosphate system, the mole ratio of N:P must be greater than 1/1. For product where 50 percent of the total $P_2O_5$ is present as polyphosphate, this ratio, if the only crystalline phases are MAP and triammonium pyrophosphate (TAPP), would be about 1.25 while, for 60 percent conversion to polyphosphate, this value would be about 1.35. Although it would be desirable that the N:P mole ratio be adjusted to the required level or slightly higher, it has been found that an acceptable product is obtained when the ratio is as low as about 1.2.

To illustrate the effect of these parameters on the quality of the product, the temperature of the melt was varied while maintaining the other variables essentially constant. As is evident from Table I, the availability is 100 percent up to about 425° F. Above about 440° F., the insoluble level builds rapidly at the residence times employed until all the iron and aluminum are in the insoluble pyrophosphate form.

TABLE I

| Reactor temperature° F. (4) | Melt temperature (10) | Percent unavailable $P_2O_5$ | Residence time (min.) (4-10) |
|---|---|---|---|
| 390 | 376 | 0.00 | 4-5 |
| 415 | 409 | 0.00 | 4.5 |
| 425 | 422 | 0.00 | 3-4.5 |
| 455 | 440 | 0.41 | 3-4 |
| 470 | 449 | 2.20 | 2-4 |
| 495 | 457 | 3.58 | 3-4 |
| 508 | 474 | 4.05 | 3-4 |

The foregoing results were obtained by reacting wet-process acid ($R_2O_3$:$P_2O_5$, mole ratio) and ammonia in an impingement type reactor, as illustrated in FIG. 1 by block 4, and feeding the product to vessel 10 via line 9 and retaining the ammonium phosphate product in line 9 for the indicated time period. The residence time in reactor 4 and line 9 is less than one second. It has been found that, for a melt with the N:P mole ratio below one (which is the case for a single-stage reactor), no loss in availability occurs within this time limit with a reactor temperature up to about 550° F. when the $R_2O_3$:$P_2O_5$ mole ratio in the wet-process acid is less than about 0.1. This represents a significant improvement and results from the method by which the initial reaction is affected and supplemental enthalpy is introduced. It is desired that the gas streams to reactors 4 and 15 be mixed with the fluid stream so that a high impingement velocity results. As indicated above, gas streams between 20 and 2,500 feet/second are employed, while 1,000-2,000 ft./second are preferred, in reactor 4; and in reactor 15, gas streams between 100 and 2500, and preferably 1,000-2,000, feet per second are employed. Further, it is preferred, from the standpoint of corrosion and quality, that the supplemental enthalpy input be disproportionated in favor of ammonia, i.e., employing super-heated ammonia.

The dual impingement reactor process, as described above, for the production of APP offers several advantages. Because of the higher energy efficiency, it enables the use of significantly lower acid temperatures. It permits maximum flexibility in processing. The capability of being able to achieve considerably lower residence time and, hence, the establishment of an optimum time-temperature-composition relationship permits the use of lower quality acid without introducing adverse effects. Hence, for a given acid, it permits maximum conversion to the polyphosphate form while maintaining the necessary quality. The use of the dual reactor process is contingent upon the reduction of the mass flow of steam to the primary reactor, that is, to minimize the gas flow to the primary reactor.

The upper operating temperature is determined by the kinetic stability of the resulting ammonium phosphate. This is to say, the supplemental enthalpy input derived from heating of the acid and ammonia and the chemical enthalpy generated by the adjustment of $NH_3$:$H_3PO_4$ mole ratio, are balanced so that the N:P mole ratio in melt streams 14 or 12 is substantially identical to that of feed streams 1 and 5 (i.e., all ammonia entering reactor 4). Thus, stream 11 would be free of any ammonia. Further, it would be desirable that the total enthalpy input be adjusted to a level that the free water introduced via acid stream 1 and stream 18 is essentially moved via stream 11. Moreover, it is advantageous if a high polyphosphate product is desired, to convert a portion of the $P_2O_5$ into the polyphosphate form in primary reactor 4. Since the conversion to polyphosphates is primarily a function of temperature of melt and, hence, the total enthalpy input, the degree to which this can be economically accomplished will be dictated by a balance between the kinetic stability toward dissociation of the ammonium phosphate and the supplemental energy input. Further, the temperature at which the melt emerges from separator 10 must be below where formation of the insoluble iron, aluminum phosphates occurs. Likewise, it is advantageous that the residence time and temperature in vessel 10 be such that no adverse effects are introduced in the following processing stages. For example, the introduction of nucleation sites could promote rapid formation of insolubles in reactor 15.

Data given in Table II represents a summary of results depicting the effect of temperature on the composition and quality of melt when held at the respective melt temperature for 2-4 minutes. The composition of the melt approached that of the $NH_3$:$H_3PO_4$ mole ratio in the feed stream, i.e., 0.75-0.8. The $R_2O_3$:$P_2O_5$ mole ratio in the wet acid was 0.08. As is apparent from these results, no loss in availability occurs until the temperature is above about 425–430° F. Also, the free water is essentially removed at temperatures greater than about 400° F. As demonstrated above, higher temperatures can be employed without the introduction of insolubles when shorter residence times are used. However, for the reason already mentioned, extreme care must be taken not to impose serious limitations on further processing.

TABLE II

| Reactor 4 temperature | Melt 12 temperature | Conversion to polyphosphate percent of total $P_2O_5$ | Percent $H_2O$ in Melt 11 | Total $P_2O_5$ unavailable | Percent of total $P_2O_5$ water soluble |
|---|---|---|---|---|---|
| 345 | 338 | 6.83 | 4.88 | 0.00 | <99 |
| 372 | 352 | 8.15 | 2.72 | 0.00 | <99 |
| 390 | 376 | 14.69 | 1.41 | 0.00 | <99 |
| 420 | 412 | 28.02 | <0.1 | 0.00 | 98–99 |
| 425 | 422 | 30.8 | <0.1 | 0.00 | 97–99 |
| 452 | 441 | 33.36 | <0.1 | 0.3–0.5 | 97–98 |
| 470 | 449 | 37–35 | <0.1 | 2.0–3.5 | 93–95 |
| 500 | 463 | 40.00 | <0.1 | 3.5–4.2 | 92–95 |

Figure 2:
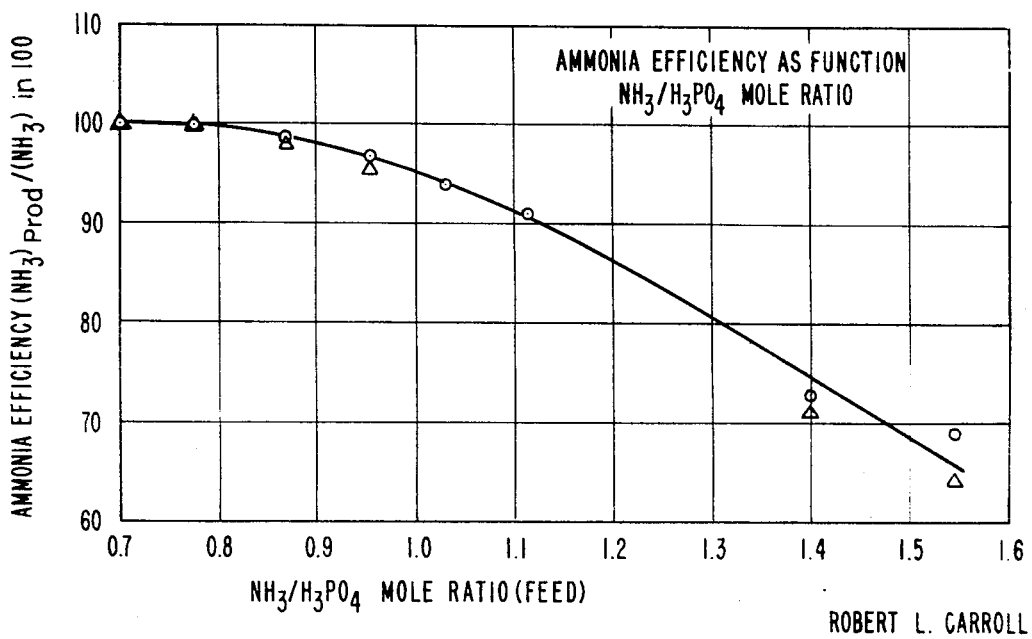
FIG. 2 is a graph of ammonia efficiency in the process as a function of the $NH_3:H_3PO_4$ mole ratio in the feed streams.

The upper operating limit for the $NH_3:H_3PO_4$ mole ratio for reactor 4 is determined by (1) melt temperature, (2) residence time in vessel 10 and (3) the energy balance between reactors 4 and 15. FIG. 2 relates the ammonia efficiency as a function of the $NH_3:H_3PO_4$ mole ratio in the feed streams with a residence time of less than 30 seconds. The melt temperature ranged from 450–470° F. Under these conditions, 100 percent ammonia efficiency is attained only when the ratio is below about 0.8. However, when the residence time is increased to 3–5 minutes, the ratio must be below about 0.7. The operating pressure of reactor 4 and vessel 10 is in the range of 15 p.s.i.a. to 75 p.s.i.a. However, it is advantageous to operate reactor 4 and vessel 10 at low pressures since (1) low pressure favors conversion to condensed phosphates and (2) low pressure operation for reactor 4 eliminates the need for a compressor for stream 18. Moreover, it is advantageous that the supplemental heat necessary for producing a high conversion to condensed phosphates be introduced via streams 8 to 18 or both. Superheating of these streams eliminates the need for heating the acid to temperatures where conventional heat exchangers cannot be employed.

The melt fed into reactor 15 is further reacted with anhydrous ammonia. The enthalpy of stream 7, depending on the required heat balance and desired end product, can be varied by employing either liquid ammonia or gaseous ammonia superheated to about 900° F. The operating ammonia vapor pressure of reactor 15 and vessel 17 will be at or slightly above the dissociation vapor pressure of the APP melt. Hence, since the operating pressure is determined by the partial pressure of ammonia and not the total pressure in vessel 17, it is advantageous that the melt from vessel 10 contain no free water and the steam derived from further conversion be diluted as much as possible with ammonia. In addition, a high vapor pressure of ammonia, when the nitrogen:phosphorus mole ratio is above about 1.15, will retard the formation of insolubles. This can partially be realized by consideration of the composition of the insoluble material, i.e., the fact that it contains one mole of $NH_3$ and that high ammonia vapor pressures favor the formation of $(NH_4)_3HP_2O_7$ and $(NH_4)_4P_2O_7$. It is also advantageous from the standpoint of quality that the residence time in reactor 15 and vessel 17 be below about 2 minutes. The optimum residence time will vary with the temperature of the melt, ammonia vapor pressure and the quality of the acid.

The invention is also illustrated by the following examples.

EXAMPLE 1

Wet-process acid at 275° F. containing 53.7% (weight) of $P_2O_5$ and having an $R_2O_3:P_2O_5$ mole ratio of 0.075, is fed at a rate of 955 lbs./hour through line 3 to reactor 4 where it is reacted with ammonia passed into reactor 4 from stream 18 at 475° F. The $NH_3:H_3PO_4$ mole ratio to reactor 4 is maintained at about 0.65. The supplemental enthalpy input is adjusted to give a melt temperature in vessel 10 of about 425° F. Energy input to the system can be controlled by any one or more of three parameters: acid temperature, ammonia temperature, and the enthalpy derived from the N:P molar ratio. The residence time in vessel 10 is 1.5 minutes. The resulting melt in vessel 10 is pumped to reactor 15 via line 14 where it is reacted with anhydrous ammonia passed from line 7' to reactor 15 at 310° F. and 80 p.s.i.g. The reaction product formed in reactor 15 is passed through line 16 to vessel 17. The temperature of the melt in vessel 17 is 478° F., while the pressure is maintained at 60 p.s.i.g. The total residence time in reactor 15 and vessel 17 is less than 1 minute. The melt in vessel 17 is cooled rapidly to 390° F. and is passed through line 20 to granulation system 24 wherein it is granulated to a stable free flowing solid.

The product discharged from vessel 10 contains approximately 27–30% conversion of $P_2O_5$ to the polyphosphate form, while the material discharged via line 21 contains approximately 58–63% conversion of $P_2O_5$. A more complete summary of these results is listed below:

| | Temperature (° F.) | Pressure (p.s.i.g.) | $P_2O_5$ content (percent) | Nitrogen content (percent) | Water soluble $P_2O_5$ percent of total | Unavailable $P_2O_5$ percent of total | $H_2O$ in product (percent) |
|---|---|---|---|---|---|---|---|
| Reactor 4 | 425 | 40 | | | | | |
| Melt (10) | 422 | 1–2 | 61.9–62.5 | 7.75 | 98–99 | 0.00 | 0.2–0.3 |
| Reactor 15 | 487 | 60 | | | | | |
| Melt (17) | 478–480 | 60–65 | 58.7–59.4 | 14.0–14.3 | 98–98.5 | 0.01–0.15 | 0.1 |

Examination of the crystalline component of the solid material by X-ray diffraction indicated only two major crystalline phases, monoammonium orthophosphate (MAP) and triammonium polyphosphate (TAPP). Two minor crystalline phases were present, namely, diammonium orthophosphate and tetrammonium pyrophosphate.

EXAMPLE 2

The wet-process acid, described in Example 1, is pumped at a rate of 2,250 lbs./hour through line 3 to reactor 4 at 240° F. and 20 p.s.i.g. Ammonia is fed to reactor 15 at 750° F. and 70 p.s.i.g. The ammonia flow to reactor 15 is adjusted so that the flow via stream 18 to reactor 4 is sufficient to give a melt temperature in stream 14 of about 400° F. This temperature is sufficient to reduce the free water level in stream 14 to below about one percent, with approximately 18–22 percent conversion of $P_2O_5$ to the polyphosphate form. The residence time for the melt in vessel 17 is less than 45 seconds. The melt is transferred via line 19 to fluids operation 25 where the temperature is reduced rapidly to below 150° F. Ammonia and water are continuously added to operation 25 through line 26, resulting in the production of a 12–40–0 fluid. A more complete set of results is listed below:

| | Temperature (°F.) | Pressure (p.s.i.g.) | $P_2O_5$ content (percent) | Nitrogen content (percent) | Water soluble $P_2O_5$ percent of total | Unavailable $P_2O_5$ percent of total | Conversion to polyphosphate form percent of total |
|---|---|---|---|---|---|---|---|
| Reactor 4 | 403 | 20 | | | | | |
| Melt (10) | 395 | 1 | 59.9–61.0 | 7.2–7.40 | 98–99 | 0.00 | 18–22 |
| Reactor 15 | 494 | 70 | | | | | |
| Melt (17) | 484 | 35 | 58.4–59.0 | 12.2–12.5 | 97–98 | <0.1 | 61–63 |
| Fluid 25 | | | 39.8–40.0 | 11.8–12.1 | 97–98 | <0.1 | 59–60 |

We claim:

1. The process for the production of ammonium polyphosphates by ammoniation of wet-process phosphoric acid wherein at least about 50% by weight of the $P_2O_5$ thereof is in polyphosphate form and which the polyphosphates have excellent water solubility and essentially complete availability as plant food, which comprises:
    (a) contacting wet-process phosphoric acid having a $P_2O_5$ content of from about 50% to about 65%, by weight, and an $R_2O_3:P_2O_5$ mole ratio of less than about 0.1, wherein R represents aluminum and iron, with impinging ammonia gas at a gas stream velocity of from about 1,000 to about 2,500 feet per second, at an $NH_3:H_3PO_4$ mole ratio of from about 0.4 to about 0.8, a temperature between about 375° F. and about 425° F., a pressure of from about 15 to about 75 pounds per square inch absolute, and a residence time of from about 0.1 to about 4 minutes, to form an ammonium phosphate product and steam;
    (b) removing steam from the product obtained in (a) whereby an ammonium phosphate melt having an N:P mole ratio of less than about 0.8 is formed;
    (c) contacting the ammonium phosphate with excess impinging ammonia at a velocity of from about 1,000 to about 2,500 feet per second, a temperature between about 450 and about 550° F., a pressure of from about 30 to about 200 pounds per square inch absolute, and a residence time of from about 5 seconds to less than 2 minutes, to form an ammonium polyphosphate wherein at least about 50% by weight of the $P_2O_5$ thereof is in a polyphosphate form.

2. The process of claim 1, wherein the $R_2O_3:P_2O_5$ mole ratio in (a) is about 0.08.

3. The process of claim 1, wherein the temperature in (a) is from about 390° F. to about 420° F.

4. The process of claim 1, wherein the total residence time in (a) and (b) is from about 0.5 to about 2 minutes.

5. The process of claim 1, wherein the residence time in (c) is from about 0.2 to about 0.5 minutes.

6. The process for the production of a fluid ammonium polyphosphate fertilizer wherein at least about 50% by weight of the $P_2O_5$ thereof is in polyphosphate form and which the polyphosphates have excellent water solubility and essentially complete availability as plant food, which comprises:
    (a) contacting wet-process phosphoric acid having a $P_2O_5$ content of from about 50% to about 65% by weight and an $R_2O_3:P_2O_5$ mole ratio of less than about 0.1, wherein R represents aluminum and iron, with impinging ammonia gas at a gas stream velocity of from about 1,000 to about 2,500 feet per second, at an $NH_3:H_3PO_4$ mole ratio of from about 0.4 to about 0.8, a temperature between about 375° F. and about 425° F., a pressure of from about 15 to about 75 pounds per square inch absolute, and a residence time of from about 0.1 to about 4 minutes, to form an ammonium phosphate product and steam;
    (b) removing steam from the product obtained in (a) whereby an ammonium phosphate melt having an N:P mole ratio of less than about 0.8 is formed;
    (c) contacting the ammonium phosphate melt with excess impinging ammonium at a velocity of about 1,000 to about 2,500 feet per second, a temperature between about 450 and about 550° F., a pressure of from about 30 to about 200 pounds per square inch absolute, and a residence time of from about 5 seconds to less than 2 minutes, to form an ammonium polyphosphate wherein at least about 50% by weight of the $P_2O_5$ thereof is in a polyphosphate form,
    (d) removing steam from the product obtained in (c), and
    (e) contacting the ammonium phosphate melt obtained in (c) with ammonia and water to form an aqueous ammonium polyphosphate and neutralizing the aqueous ammonium polyphosphate.

References Cited
UNITED STATES PATENTS

| | | | |
|---|---|---|---|
| 3,310,371 | 3/1967 | Lutz | 23—107 |
| 3,238,021 | 3/1966 | Webber et al. | 23—259.1 |
| 3,382,059 | 5/1968 | Getsinger | 71—34 |
| 3,399,031 | 9/1968 | McCarthy | 23—107 |
| 3,419,378 | 12/1968 | Kearns | 71—34 |
| 3,420,624 | 1/1969 | Fitch | 23—107 |
| 3,464,808 | 9/1969 | Kearns | 71—34 |
| 3,492,087 | 1/1970 | MacGregor et al. | 71—43 X |
| 3,503,706 | 3/1970 | Legal | 23—107 |
| 3,420,524 | 1/1969 | Fitch | 23—107 |

REUBEN FRIEDMAN, Primary Examiner

R. BARNES, Assistant Examiner

23—107; 71—43